(12) United States Patent
Kannan (10) Patent No.: US 10,025,641 B2
(45) Date of Patent: Jul. 17, 2018

(54) WORKLOAD DIFFERENTIATION FOR PROCESSOR FREQUENCY SCALING

(71) Applicant: Qualcomm Innovation Center, Inc., San Diego, CA (US)

(72) Inventor: Saravana Krishnan Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 15/240,788

(22) Filed: Aug. 18, 2016

(65) Prior Publication Data

US 2017/0075733 A1 Mar. 16, 2017

Related U.S. Application Data

(60) Provisional application No. 62/218,935, filed on Sep. 15, 2015, provisional application No. 62/232,893, filed on Sep. 25, 2015.

(51) Int. Cl.
*G06F 9/50* (2006.01)
*G06F 1/32* (2006.01)
*G06F 9/455* (2018.01)

(52) U.S. Cl.
CPC ............ *G06F 9/5083* (2013.01); *G06F 1/324* (2013.01); *G06F 9/45558* (2013.01); *G06F 2009/4557* (2013.01)

(58) Field of Classification Search
CPC ...... G06F 1/3203; G06F 1/324; G06F 9/5094; G06F 1/32; G06F 1/329; G06F 1/3296; G06F 9/4881; G06F 1/3206; G06F 1/3228; G06F 1/3243; G06F 2209/5011; G06F 2209/504; G06F 9/4893; G06F 9/5038; G06F 9/5083; Y02B 60/1217; Y02B 60/144; Y02B 60/142
See application file for complete search history.

(56) References Cited

U.S. PATENT DOCUMENTS

| | | | | |
|---|---|---|---|---|
| 8,631,262 | B2 * | 1/2014 | Park | G06F 1/3203 |
| | | | | 713/300 |
| 9,086,876 | B2 * | 7/2015 | Gustafsson | G06F 1/3203 |
| 9,400,544 | B2 * | 7/2016 | Klingauf | G06F 1/3275 |
| 2007/0049133 | A1 * | 3/2007 | Conroy | G06F 1/26 |
| | | | | 439/894 |
| 2009/0100276 | A1 * | 4/2009 | Rozen | G06F 1/3203 |
| | | | | 713/300 |
| 2011/0046804 | A1 * | 2/2011 | Fong | G06F 1/206 |
| | | | | 700/291 |
| 2011/0264938 | A1 * | 10/2011 | Henroid | G06F 1/3203 |
| | | | | 713/323 |
| 2013/0139170 | A1 | 5/2013 | Prabhakar et al. | |

(Continued)

*Primary Examiner* — Jaweed A Abbaszadeh
*Assistant Examiner* — Brian J Corcoran
(74) *Attorney, Agent, or Firm* — Neugeboren O'Dowd PC (57) ABSTRACT

A method and device for controlling a frequency of a processor of a computing device are disclosed. The method includes receiving requests to process tasks on a processor of the computing device, classifying each of the tasks as either a new workload group or an historic workload group, and monitoring a load placed on the processor due to each of the workload groups. And the frequency of the processor is controlled based upon a total workload on the processor and a contribution of each of the workload groups to the total workload.

17 Claims, 5 Drawing Sheets

(56) References Cited

U.S. PATENT DOCUMENTS

| | | | | |
|---|---|---|---|---|
| 2014/0068285 A1* | 3/2014 | Lee | ............ | G06F 1/324 |
| | | | | 713/300 |
| 2014/0101420 A1* | 4/2014 | Wu | ............ | G06F 1/3206 |
| | | | | 713/1 |
| 2015/0134982 A1* | 5/2015 | Park | ............ | G06F 1/324 |
| | | | | 713/300 |
| 2015/0339163 A1* | 11/2015 | Kim | ............ | G06F 1/32 |
| | | | | 718/104 |
| 2016/0320825 A1* | 11/2016 | Panda | ............ | G06F 1/3206 |

* cited by examiner

- Get new_load and total_load from scheduler
- If new_load/total_load >= new_heuristic_threshold
  - CPU freq = performance_biased_CPU_freq_selection(total_load)
- Else
  - CPU freq = balanced_CPU_freq_selection(total_load)

FIG. 3

- Get new_load and total_load from scheduler
- historic_load = total_load – new_load
- new_load_freq = aggressive_CPU_ramp_up(new_load)
- historic_load_freq = balanced_CPU_ramp_up(historic_load)
- CPU freq = (new_load / total_load * new_load_freq)
    + (historic_load / total_load * historic_load_freq)

FIG. 4

- Get new_load and total_load from scheduler
- new_load_freq = aggressive_CPU_ramp_up(total_load)
- historic_load_freq = balanced_CPU_ramp_up(total_load)
- new_load_weight = new_load / total_load
- hist_load_weight = 1 - new_load_weight
- If new_load_weight < almost_nothing_new_weight, then
  - hist_load_weight = hist_load_weight + new_load_weight
  - new_load_weight = 0,
- If new_load_weight > almost_everything_new_weight, then
  - new_load_weight = new_load_weight + hist_load_weight
  - hist_load_weight = 0
- CPU freq = (new_load_weight * new_load_freq) + (hist_load_weight * historic_load_freq)

FIG. 5

- CPU freq = (group-new-weight * group-new-freq) + (group-general-weight * group-general-freq) + (group1-weight * group1-freq) + (group2-weight * group2-freq) + ... + (groupN-weight * groupN-freq)
- Where groupX-weight = groupX-load / total load
- And, groupX-freq = CPUfreq_selection_heuristicX(total_load)

FIG. 6A

CPU freq = group-new-freq + group-general-freq + group1-freq + group2-freq + ... + groupN-freq)

Where, groupX-freq = CPUfreq_selection_heuristicX(groupX-load)

WORKLOAD DIFFERENTIATION FOR PROCESSOR FREQUENCY SCALING

CLAIM OF PRIORITY UNDER 35 U.S.C. § 119

The present Application for Patent claims priority to Provisional Application No. 62/218,935, filed Sep. 15, 2015, and 62/232,893, filed Sep. 25, 2015, both entitled "Workload Differentiation for Processor Frequency Scaling," and assigned to the assignee hereof and hereby expressly incorporated by reference herein.

BACKGROUND

Field

The present disclosed embodiments relate generally to computing devices, and more specifically to frequency control of processors of computing devices.

Background

Computing devices including devices such as smartphones, tablet computers, gaming devices, and laptop computers are now ubiquitous. These computing devices are now capable of running a variety of applications (also referred to as "apps") and many of these devices include multiple processors to process tasks that are associated with apps. In many instances, multiple processors are integrated as a collection of processor cores within a single functional subsystem. It is known that the processing load on a mobile device may be apportioned to the multiple cores. Some sophisticated devices, for example, have multiple core processors that may be operated asynchronously at different frequencies. On these types of devices, the amount of work that is performed on each processor may be monitored and controlled by a central processing unit (CPU) governor to meet workloads.

In general, the goal of CPU frequency scaling is to provide just enough CPU frequency to meet the needs of the work load on the CPU. This ensures adequate performance without wasting power and allows for a good performance/power ratio. A majority of the complexity and success of CPU frequency scaling comes from predicting the future load accurately and applying a user pre-initialized curve/heuristic function that converts a given load to a CPU frequency.

Existing CPU load prediction and CPU frequency selection algorithms have some heuristics for quickly increasing the CPU frequency in case the workload needs maximum CPU capacity. But the heuristics used in existing algorithms cannot be used too aggressively to increase the CPU frequency because that will waste a lot of power when the workload doesn't need maximum CPU frequency (or even need a much higher frequency than what the CPU is currently running at).

Due to this, when a new workload that needs a high/maximum CPU frequency starts up, the existing algorithms take a lot of time to reach very high/maximum CPU frequency if the current CPU frequency is low. This slow ramp up causes noticeable performance loss in many use cases such as launching apps or starting off an action from within an app.

SUMMARY

According to an aspect, a method for controlling a frequency of a processor of a computing device is disclosed. The method includes receiving requests to process tasks on a processor of the computing device, classifying each of the tasks as either a new workload group or an historic workload group, and monitoring a load placed on the processor due to each of the workload groups. A frequency of the processor is controlled based upon a total workload on the processor and a contribution of each of the workload groups to the total workload.

Another aspect may be characterized as a computing device. The computing device includes a processor configured to process tasks and an operating system. The operating system is configured to receive requests to process tasks on the processor, classify each of the tasks as either a new workload group or an historic workload group, and monitor a load placed on the processor due to each of the workload groups. The operating system is also configured to determine a contribution of each of the workload groups to a total workload of the tasks on the processor and control a frequency of the processor based upon a contribution of each of the workload groups to the total workload of the tasks on the processor.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
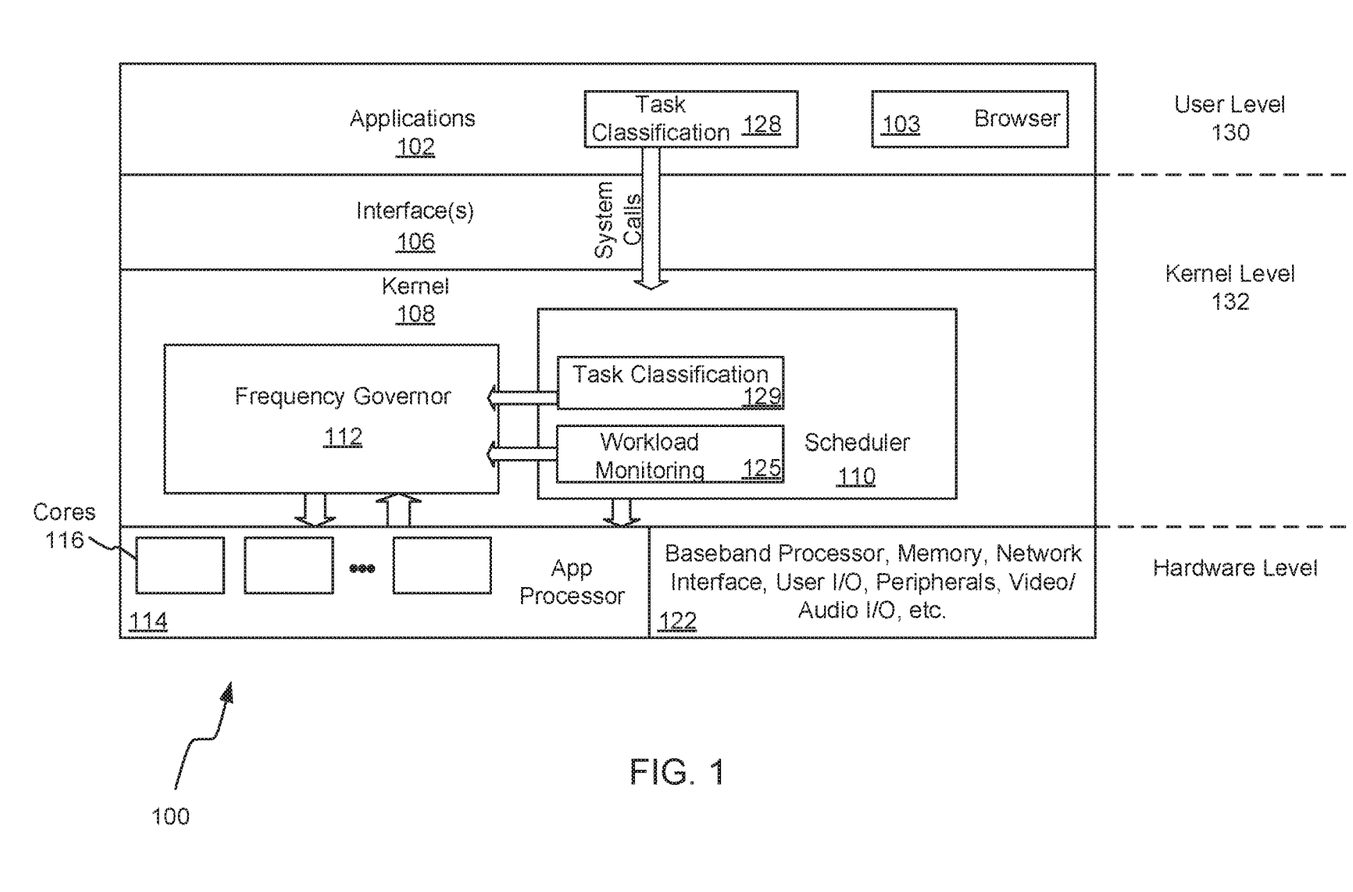
FIG. 1 is a block diagram of a computing device.

Referring to FIG. 1, it is a block diagram illustrating components of a computing system 100 (also referred to herein as a computing device 100). The block diagram includes applications 102 (e.g., a web browser 103) at the highest level of abstraction and hardware such as the applications processor 114, which includes a plurality of processing cores 116, at the lowest level. The kernel 108 along with interface 106 enable communication between the applications 102 and the applications processor 114. In particular, the interface 106 passes system calls from the applications 102 to the kernel 108. The frequency governor 112 (also referred to herein as the governor 112 or processor governor 112) generally operates to monitor a load on the applications processor 114, and determine an operating frequency to operate the processor cores 116.

Although the specific embodiment depicted in FIG. 1 depicts multiple processor cores 116 within an app processor 114, it should be recognized that other embodiments include a plurality of processors or CPUs that are not integrated within the app processor 114. As a consequence, the operation of multiple processors is described herein in the context of both multiple processor cores 116 and multiple discrete processors or CPUs. In other words, the term "processor" as used herein includes processor cores (such as processor cores 116 within a CPU such as the app processor 114) and discrete CPUs. It should also be recognized that the methodologies described herein may operate in connection with multiple processors operating at the same frequency and multiple processors operating at different frequencies.

The one or more applications 102 at the user level 130 may be realized by a variety of applications that operate via, or run on, the app processor 114. For example, the one or more applications 102 may include a web browser 103 and associated plug-ins, entertainment applications (e.g., video games, video players), productivity applications (e.g., word processing, spread sheet, publishing applications, video editing, photo editing applications), core applications (e.g., phone, contacts), and augmented reality applications.

Also shown, at the user level 130 and kernel level 132 are task classification modules 128 and 129, respectively, which are configured to classify tasks into at least two workload groups as described further herein. As depicted in FIG. 1, the task classification modules 128 and 129 may be simultaneously implemented in the user level 130 and kernel level 132, respectively. In the context of an ANDROID environment for example, the task classification module 128 in the user level 130 may be implemented as a part of the ANDROID user space framework, and the task classification module may be implemented as a part of the LINUX kernel. In alternative embodiments, only one of the task classification modules 128 and 129 is implemented.

As one of ordinary skill in the art will appreciate, the user-space 130 and kernel-level 132 components depicted in FIG. 1 may be realized by hardware in connection with processor-executable code stored in a non-transitory tangible processor readable medium such as nonvolatile memory, and can be executed by app processor 114. Numerous variations on the embodiments herein disclosed are also possible. For instance, the frequency governor 112 may be realized by modified versions of the following non-exclusive list of governors: interactive, conservative, ondemand, userspace, powersave, performance.

In general, the frequency governor 112 operates to adjust the operating frequency of each of the processor cores 116 based upon the workload that each processor core is performing. If a particular one of the processor cores 116 has a heavy load, the governor 112 may increase a frequency of the particular processing core. If another processing core has a relatively low load or is idle, the frequency of that processor core may be decreased (e.g., to reduce power consumption). As described further herein, unlike the prior art, the frequency governor 112 may receive additional information from the scheduler 110 about tasks that are scheduled for execution on a processor. For example, the frequency governor 112 may receive information about the workload groups that are scheduled and also how much load each workload group contributes. But the frequency governor 112 may also receive additional information about the tasks.

The frequency governor 112 can then control the operating frequency of the processor cores 116. In many embodiments, this frequency control is carried out independently on each processor core, with each processor core scaling independently of the others.

Among other functions, the scheduler 110 (also referred to herein as a scheduling component 110) operates to schedule tasks among the processor cores 116 to balance the load that is being processed by the app processor 114. But in this embodiment, the scheduler 110 has a workload monitoring module 125. The workload monitoring module 125 provides additional information to the frequency governor 112 about what amount of the load being reported is coming from each workload group. For example, the workload monitoring module 125 may provide an indication of an amount of the workload that is coming from new workloads and an amount of the workload that is due to historic workloads. As a consequence, dynamic frequency scaling may include more aggressive heuristics for increasing or decreasing the processor frequency based on how much of the reported load is coming from new workloads versus historic workloads. This gives new workloads an opportunity to quickly show their true processor requirement, and in the meantime, allows the scheduler 110 and frequency governor 112 to obtain enough historic data to improve its future predictions of the workload.

Figure 2:
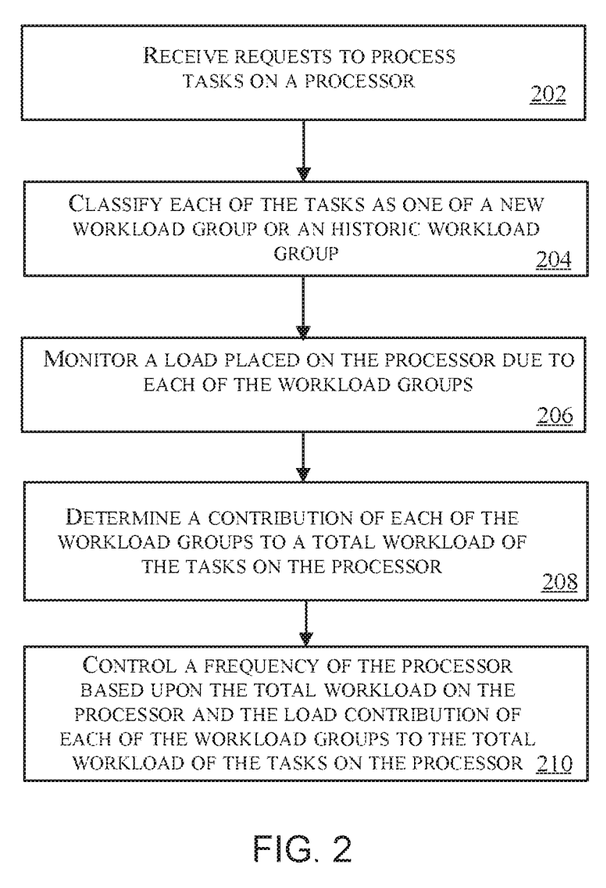
FIG. 2 is a flowchart depicting a method that may be traversed in connection with embodiments disclosed herein.

Referring next to FIG. 2, shown is a flowchart depicting a method that may be carried out in connection with embodiments disclosed herein. In operation, the scheduler 110 receives requests to process tasks on a processor (e.g., a CPU, app processor 114, one of the cores 116) (Block 202). Each of the tasks is then classified as one of a new workload group or an historic workload group (Block 204). As shown in FIG. 1, the requests to process the tasks may originate from applications 102 at the user level, and the scheduler 110 may receive the requests via system calls from the user level 130. As shown, the task classification modules 128 or 129 may classify the requests into the new and historic workload groups. The classes of workload groups may include only two classes: the new workloads and the historic (anything but new) workloads. But in some enhanced embodiments, tasks may be classified in one or more groups in addition to the new workload group and the historic workload group.

In turn, the workload monitoring module 125 which is part of the scheduler 110 monitors a load placed in the processor due to each of the workload groups (Block 206). In addition, the scheduler 110 also determines a contribution of each of the workload groups to a total workload of the tasks on the processor (Block 208).

As shown in FIG. 2, the frequency governor 112 then controls the frequency of the processor based upon the total workload on the processor and the load contribution of each of the workload groups to the total workload of the tasks on the processor (Block 210). Described further herein with reference to FIGS. 3-6 are various different approaches to controlling processor frequency that are consistent with the method depicted in FIG. 2.

A task (process or thread) can be classified a "new workload" if it meets any of the following criteria:

In systems where the load tracking is done in quantized windows, a particular task may be characterized as a new workload if a total number of quantized windows since the task's creation in which it has run (actually executed on the processor) is less than N windows, where N is a configurable value.

A threshold number of seconds (e.g., X milliseconds) have not passed since the task was created or since the particular task woke up after sleeping longer than a sleep threshold (e.g., Z milliseconds).

Figure 3:
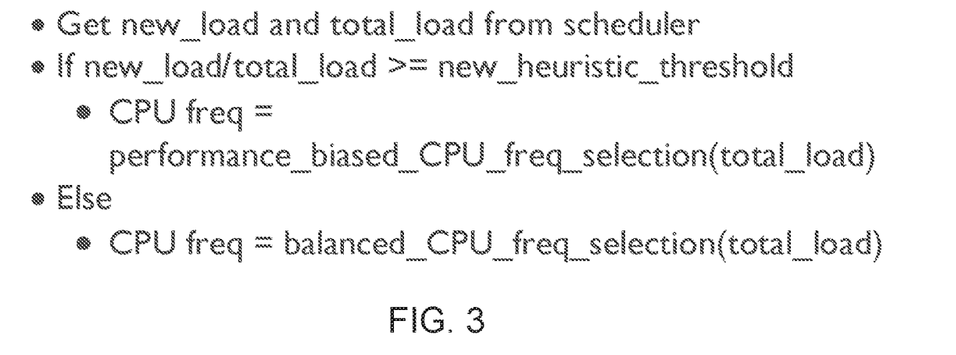
FIG. 3 is a drawing depicting a pseudo-code representation of one approach that is consistent with the method described with reference to FIG. 2.

One approach reflected in FIG. 3 is to select a load-to-frequency-function from a list of load-to-frequency-functions based on what percentage of the workload is a new workload versus historic workload. Once the load-to-frequency-function is selected, it is applied on the entire load reported by the scheduler 110 to compute the final processor frequency. In the example depicted in FIG. 3, a determination is made whether a ratio of the new workload to the total workload is greater than or equal to a threshold, and if the ratio is greater than or equal to the threshold, a performance-biased load-to-frequency-function is selected and used to set the frequency of the processor. If the ratio is less than or equal to the threshold, a balanced load-to-frequency-function is selected and used to set the frequency of the processor.

As used herein, the term load-to-frequency-function (also referred to as a heuristic) is generally a function that relates workloads to frequencies. The load-to-frequency-function may be realized in a variety of different manners without departing from the scope of the present invention. The relationship between workloads and frequencies, for example, may be represented as (without limitation) a staircase function, a continuous function, or combinations thereof. Although the load-to-frequency-functions may vary, in general, as a load increases the frequency increases, but again, the relationship between loads and frequencies need not be linear. In implementation, the load-to-frequency-function may be implemented as a table, an equation, or combinations thereof.

Figure 4:
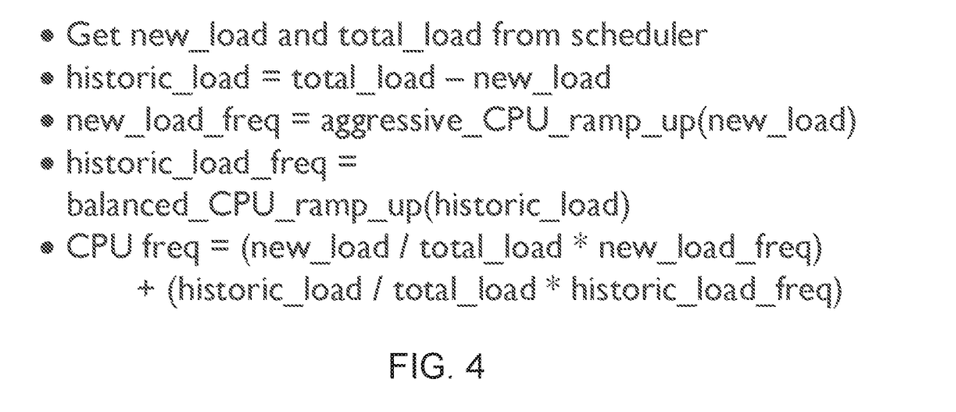
FIG. 4 is a drawing depicting a pseudo-code representation of another approach that is consistent with the method described with reference to FIG. 2.

Another approach depicted in FIG. 4 is to separately apply a different load-to-frequency-function to the new workload and historic workload to determine their respective frequency contributions. Then, the final processor frequency is selected by computing a weighted average of the new and historic workload's frequency contributions.

Figure 5:
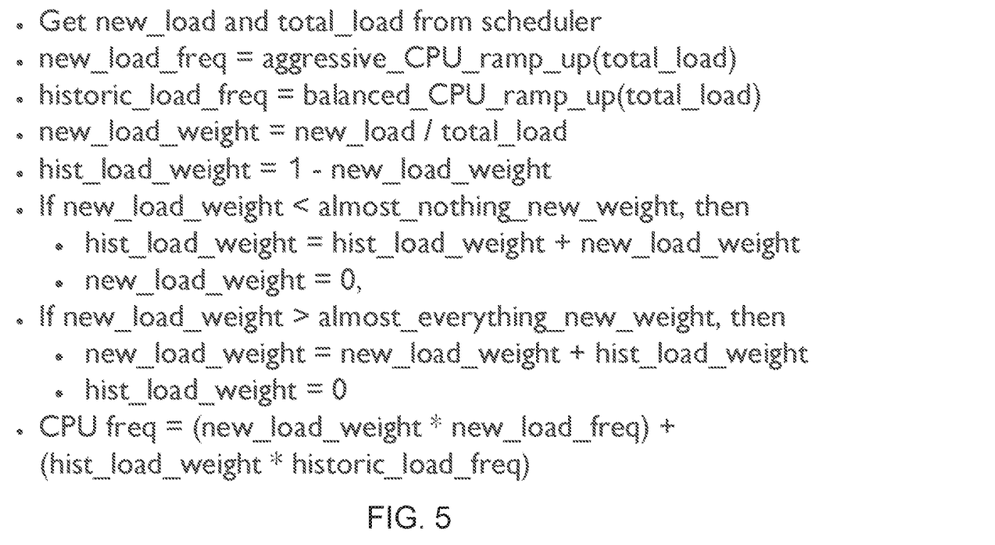
FIG. 5 is a drawing depicting a pseudo-code representation of yet another approach that is consistent with the method described with reference to FIG. 2.

Another approach to a weighted application of the load-to-frequency-functions (reflected in the pseudo-code of FIG. 5) includes applying two separate load-to-frequency-functions to the total load to compute two separate processor frequency values. The weightage of the new and historic loads are calculated, with optional rounding up/down of the weights of the new and historic loads (the sum of the weights is still the same). Then the final processor frequency is selected by doing a weighted average of the processor frequency values selected by the different load-to-frequency-functions. As shown in FIG. 5, both a new-load-frequency and an historic-load-frequency are established. A new-workload-weight equal to a ratio of the new workload to the total workload is determined, and an historic-workload-weight equal to a ratio of the historic workload to the total workload is determined. The frequency of the processor is then set to: (new-workload-weight*new-load-frequency)+(historic-workload-weight*historic-load-frequency).

Yet another approach utilizes multiple groups of tasks and their corresponding group-specific-load-to-frequency-functions. For example, groups of tasks may be represented as group1, group2, . . . , group N, group-general and group-new. The new workload group (group-new) will still be there as a dynamic group into which all newly created tasks go in by default, and after they are not "new" anymore, they may be moved to the historic workload group (group-general). At any point in time, if a task is explicitly assigned any one of the groups (including group-new and group-general), the task may be immediately moved into that group and stay there until another explicit group change is made.

Figure 6A:
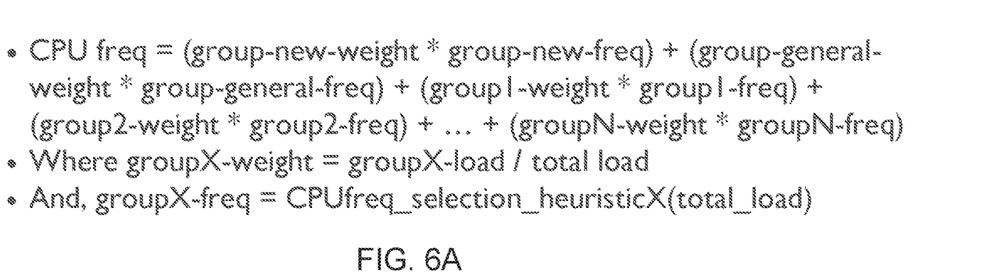
FIG. 6A is a drawing depicting a pseudo-code representation of yet another approach that is consistent with the method described with reference to FIG. 2.

According to an aspect, when the final processor frequency needs to be evaluated, it may be evaluated by applying each of a plurality of group-specific-load-to-frequency-functions to the total workload to obtain a plurality of group-specific-frequency-contribution-values. A weighting factor may then be applied to each of the group-specific-frequency-contribution-values to obtain a plurality of weighted-group-specific-frequency-contribution values, wherein the weighting factor is between 0 and 1, inclusive. The weighting factor that is applied to each particular group's frequency-contribution-value may be a ratio of that particular group's workload to the total load. Each of the weighted-group-specific-frequency-contribution values are then added and used, at least in part, to obtain the final processor frequency. FIG. 6A includes a pseudocode representation of this approach.

Figure 6B:
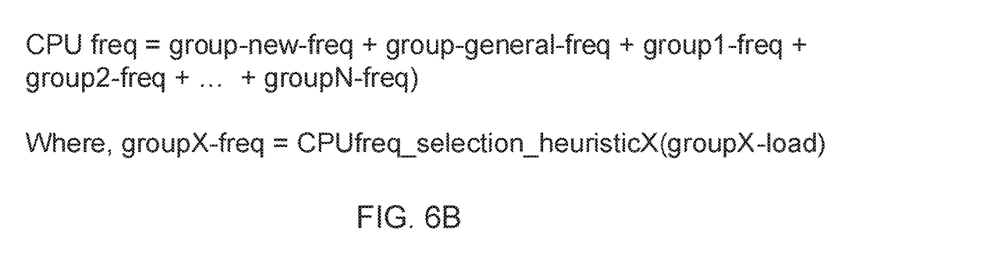
FIG. 6B is a drawing depicting a pseudo-code representation of yet another approach that is consistent with the method described with reference to FIG. 2.

According to another aspect, when the final processor frequency needs to be evaluated, it may be evaluated by applying one of a plurality of group-specific-load-to-frequency-functions to the load of a corresponding one of the workload groups to obtain a plurality of group-specific-frequency-contribution-values. A weighting factor is then applied to each of the group-specific-frequency-contribution-values to obtain a plurality of weighted-group-specific-frequency-contribution values, wherein the weighting factor is between 0 and 1, inclusive. Each of the weighted-group-specific-frequency-contribution values are then added and used, at least in part, to obtain the final processor frequency. FIG. 6B includes a pseudocode representation of this approach.

An additional enhancement to this idea is to have the scheduler keep track of what percentage of the total load is coming from each workload group. If the percentage of the total workload due to any of the workload groups exceeds a threshold value, then a notification may be sent to the frequency governor 112 to re-compute the CPU frequency immediately instead of waiting for any timer to expire.

Using this new workload differentiation in processor frequency scaling algorithm can significantly reduce the time taken for the processor to ramp up from the lowest to the highest frequency when a new workload starts up.

The time to ramp up for a new workload can go down from ~120-140 ms (6-7 windows of 20 ms each) to about 10-40 ms (one half to 2 windows of 20 ms each).

This can bring noticeable improvement in performance for real world use cases like app launches without causing a significant power increase for real world use cases such as watching a video, browsing a loaded webpage, etc.

Figure 7:
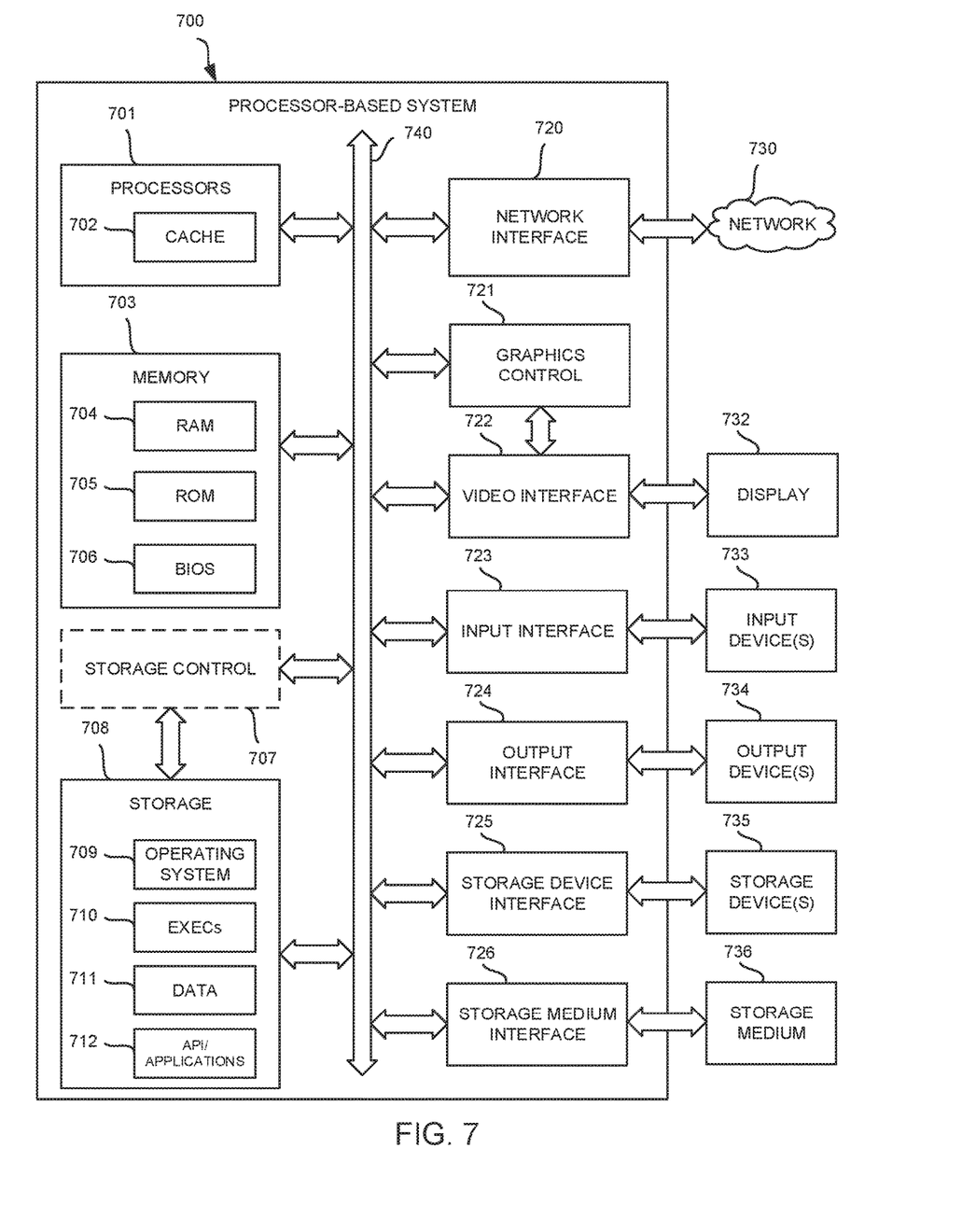
FIG. 7 is a block diagram depicting hardware components that may be used to realize the computing device depicted in FIG. 1.

The systems and methods described herein can be implemented in a machine such as a processor-based system in addition to the specific physical devices described herein. FIG. 7 shows a diagrammatic representation of one embodiment of a machine in the exemplary form of a processor-based system 700 within which a set of instructions can execute for causing a device to perform or execute any one or more of the aspects and/or methodologies of the present disclosure. The components in FIG. 7 are examples only and do not limit the scope of use or functionality of any hardware, software, embedded logic component, or a combination of two or more such components implementing particular embodiments.

Processor-based system 700 may include processors 701, a memory 703, and storage 708 that communicate with each other, and with other components, via a bus 740. The bus 740 may also link a display 732 (e.g., touch screen display), one or more input devices 733 (which may, for example, include a keypad, a keyboard, a mouse, a stylus, etc.), one or more output devices 734, one or more storage devices 735, and various tangible storage media 736. All of these elements may interface directly or via one or more interfaces or adaptors to the bus 740. For instance, the various non-transitory tangible storage media 736 can interface with the bus 740 via storage medium interface 726. Processor-based system 700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processors 701 (or central processing unit(s) (CPU(s))) optionally contain a cache memory unit 702 for temporary local storage of instructions, data, or computer addresses. Processor(s) 701 are configured to assist in execution of processor-executable instructions. Processor-based system 700 may provide functionality as a result of the processor(s) 701 executing software embodied in one or more tangible, non-transitory, tangible, processor-readable storage media, such as storage 708, storage devices 735, and/or storage medium 736. The processor-readable media may be encoded with processor readable instructions to implement particular embodiments, and processor(s) 701 may execute the software. For example, processor-executable code may be executed to realize components of the kernel 108, interfaces 106, and user level (e.g., applications 102). Memory 703 may read the software from one or more other processor-readable media (such as mass storage device(s) 735, 736) or from one or more other sources through a suitable interface, such as network interface 720. The software may cause processor(s) 701 to carry out one or more processes or one or more steps of one or more processes described or illustrated herein such as the frequency scaling of one or more of the cores 116 based upon the unified load tracking. Carrying out such processes or steps may include defining data structures stored in memory 703 and modifying the data structures as directed by the software.

The memory 703 may include various components (e.g., machine readable media) including, but not limited to, a random access memory component (e.g., RAM 704) (e.g., a static RAM "SRAM", a dynamic RAM "DRAM, etc.), a read-only component (e.g., ROM 705), and any combinations thereof. ROM 705 may act to communicate data and instructions unidirectionally to processor(s) 701, and RAM 704 may act to communicate data and instructions bidirectionally with processor(s) 701. ROM 705 and RAM 704 may include any suitable tangible processor-readable media described below. In one example, a basic input/output system 706 (BIOS), including basic routines that help to transfer information between elements within processor-based system 700, such as during start-up, may be stored in the memory 703.

Fixed storage 708 is connected bidirectionally to processor(s) 701, optionally through storage control unit 707. Fixed storage 708 provides additional data storage capacity and may also include any suitable tangible processor-readable media described herein. Storage 708 may be used to store operating system 709, EXECs 710 (executables), data 711, applications 712 (application programs), and the like. Often, although not always, storage 708 is a secondary storage medium (such as a hard disk) that is slower than primary storage (e.g., memory 703). Storage 708 can also include an optical disk drive, a solid-state memory device (e.g., flash-based systems), or a combination of any of the above. Information in storage 708 may, in appropriate cases, be incorporated as virtual memory in memory 703.

In one example, storage device(s) 735 may be removably interfaced with processor-based system 700 (e.g., via an external port connector (not shown)) via a storage device interface 725. Particularly, storage device(s) 735 and an associated machine-readable medium may provide nonvolatile and/or volatile storage of machine-readable instructions, data structures, program modules, and/or other data for the processor-based system 700. In one example, software may reside, completely or partially, within a machine-readable medium on storage device(s) 735. In another example, software may reside, completely or partially, within processor(s) 701.

Bus 740 connects a wide variety of subsystems. Herein, reference to a bus may encompass one or more digital signal lines serving a common function, where appropriate. Bus 740 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Processor-based system 700 may also include an input device 733. In one example, a user of processor-based system 700 may enter commands and/or other information into processor-based system 700 via input device(s) 733. Examples of an input device(s) 733 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 733 may be interfaced to bus 740 via any of a variety of input interfaces 723 (e.g., input interface 723) including, but not limited to, serial, parallel, game port, USB, FIREWIRE, THUNDERBOLT, or any combination of the above.

In particular embodiments, when processor-based system 700 is connected to network 730, processor-based system 700 may communicate with other devices, specifically mobile devices and enterprise systems, connected to network 730. Communications to and from processor-based system 700 may be sent through network interface 720. For example, network interface 720 may receive incoming communications (such as requests or responses from other devices) in the form of one or more packets (such as Internet Protocol (IP) packets) from network 730, and processor-based system 700 may store the incoming communications in memory 703 for processing. Processor-based system 700 may similarly store outgoing communications (such as requests or responses to other devices) in the form of one or more packets in memory 703 and communicated to network 730 from network interface 720. Processor(s) 701 may access these communication packets stored in memory 703 for processing.

Examples of the network interface 720 include, but are not limited to, a network interface card, a modem, and any combination thereof. Examples of a network 730 or network segment 730 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 730, may employ a wired and/or a wireless mode of communication. In general, any network topology may be used.

Information and data can be displayed through a display 732. Examples of a display 732 include, but are not limited to, a liquid crystal display (LCD), an organic light-emitting diode (OLED), a cathode ray tube (CRT), a plasma display, and any combinations thereof. The display 732 can interface to the processor(s) 701, memory 703, and fixed storage 708, as well as other devices, such as input device(s) 733, via the bus 740. The display 732 is linked to the bus 740 via a video interface 722, and transport of data between the display 732 and the bus 740 can be controlled via the graphics control 721.

In addition, or as an alternative, processor-based system 700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a processor-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, or hardware in connection with software. Various illustrative components, blocks, modules, circuits, and steps have been described above generally in terms of their functionality. Whether such functionality is implemented as hardware or hardware that utilizes software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read-only memory (EPROM) memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling a frequency of a processor of a computing device, the method comprising:
   receiving requests from one or more applications executing on the computing device to process tasks on a processor of the computing device;
   classifying each of the tasks as either a new workload group or an historic workload group;
   monitoring a load placed on the processor due to each of the workload groups; and
   controlling a frequency of the processor based upon a total workload on the processor and a contribution of each of the workload groups to the total workload, wherein controlling the frequency of the processor includes:
   determining whether a ratio of a new workload to the total workload is greater than or equal to a threshold;
   setting the frequency of the processor to a frequency selected by a performance-biased load-to-frequency-function if the ratio is greater than or equal to the threshold; and
   setting the frequency of the processor to a frequency selected by a balanced load-to-frequency function if the ratio is less than or equal to the threshold.

2. The method of claim 1, including:
   tracking the tasks in quantized windows; and
   classifying a particular task as a new workload if a total number of quantized windows during which the particular task ran since the particular task was created is less than N windows, where N is a configurable value.

3. The method of claim 1, wherein a particular task is classified as a new workload if a threshold number of seconds have not passed since the particular task was created or since the particular task woke up after sleeping longer than a sleep threshold.

4. The method of claim 1, comprising:
   establishing a new-load-frequency;
   establishing an historic-load-frequency;
   determining a new-workload-weight equal to a ratio of a new workload to the total workload;

determining an historic-workload-weight equal to a ratio of an historic workload to the total workload; and setting the frequency of the processor to: (new-workload-weight * new-load-frequency+historic-workload-weight * historic-load-frequency).

5. The method of claim 1, wherein controlling the frequency of the processor includes:

applying a group-specific-load-to-frequency-function to the load of each of the workload groups to obtain a plurality of group-specific-frequency-contribution-values;

applying a weighting factor to each of the group-specific-frequency-contribution-values to obtain a plurality of weighted-group-specific-frequency-contribution values, wherein the weighting factor is between 0 and 1, inclusive; and adding each of the weighted-group-specific-frequency-contribution values to obtain the frequency.

6. The method of claim 1, wherein controlling the frequency of the processor includes:

applying each of a plurality of group-specific-load-to-frequency-functions to the total workload to obtain a plurality of group-specific-frequency-contribution-values;

applying a weighting factor to each of the group-specific-frequency-contribution-values to obtain a plurality of weighted-group-specific-frequency-contribution values, wherein the weighting factor is between 0 and 1, inclusive; and adding each of the weighted-group-specific-frequency-contribution values to obtain the frequency.

7. A computing device comprising:

a processor configured to process tasks;

an operating system configured to:

receive requests to process tasks on a processor of the computing device;

classify each of the tasks as either a new workload group or an historic workload group;

monitor a load placed on the processor due to each of the workload groups;

determine a contribution of each of the workload groups to a total workload of the tasks on the processor; and control a frequency of the processor based upon a contribution of each of the workload groups to the total workload of the tasks on the processor, wherein, to control the frequency, the operating system is configured to;

apply a group-specific-load-to-frequency-function to the load of each of the workload groups to obtain a plurality of group-specific-frequency-contribution-values;

apply a weighting factor to each of the group-specific-frequency-contribution-values to obtain a plurality of weighted-group-specific-frequency-contribution values, wherein the weighting factor is between 0 and 1, inclusive; and add each of the weighted-group-specific-frequency-contribution values to obtain the frequency.

8. The computing device of claim 7, wherein the operating system is configured to:

track the tasks in quantized windows; and classify a particular task as a new workload if a total number of quantized windows during which the particular task ran since the particular task was created is less than N windows, where N is a configurable value.

9. The computing device of claim 7, wherein a particular task is classified as a new workload if a threshold number of seconds have not passed since the particular task was created or since the particular task woke up after sleeping longer than a sleep threshold.

10. The computing device of claim 7, wherein the operating system is configured to:

determine whether a ratio of a new workload to the total workload is greater than or equal to a threshold;

set the frequency of the processor to a frequency selected by a performance-biased load-to-frequency-function if the ratio is greater than or equal to the threshold; and set the frequency of the processor to a frequency selected by a balanced load-to-frequency function if the ratio is less than or equal to the threshold.

11. The computing device of claim 7, wherein the operating system is configured to:

establish a new-load-frequency;

establish an historic-load-frequency;

determine a new-workload-weight equal to a ratio of a new workload to the total workload;

determine an historic-workload-weight equal to a ratio of an historic workload to the total workload; and set the frequency of the processor to: (new-workload-weight * new-load-frequency+historic-workload-weight * historic-load-frequency).

12. The computing device of claim 7, wherein the operating system is configured to:

apply each of a plurality of group-specific-load-to-frequency-functions to the total workload to obtain a plurality of group-specific-frequency-contribution-values;

apply a weighting factor to each of the group-specific-frequency-contribution-values to obtain a plurality of weighted-group-specific-frequency-contribution values, wherein the weighting factor is between 0 and 1, inclusive; and add each of the weighted-group-specific-frequency-contribution values to obtain the frequency.

13. A non-transitory, tangible processor readable storage medium, encoded with processor readable instructions to perform a method for controlling a frequency of a processor of a computing device, the method comprising:

receiving requests to process tasks on a processor of the computing device;

classifying each of the tasks as either a new workload group or an historic workload group;

monitoring a load placed on the processor due to each of the workload groups; and controlling a frequency of the processor based upon a total workload on the processor and a contribution of each of the workload groups to the total workload, wherein controlling the frequency of the processor includes:

establishing a new-load-frequency;

establishing an historic-load-frequency;

determining a new-workload-weight equal to a ratio of a new workload to the total workload;

determining an historic-workload-weight equal to a ratio of an historic workload to the total workload; and setting the frequency of the processor to: (new-workload-weight * new-load-frequency+historic-workload-weight * historic-load-frequency).

14. The non-transitory, tangible processor readable storage medium of claim 13, the method including:

tracking the tasks in quantized windows; and classifying a particular task as a new workload if a total number of quantized windows during which the particular task ran since the particular task was created is less than N windows, where N is a configurable value.

15. The non-transitory, tangible processor readable storage medium of claim 13 wherein a particular task is classified as a new workload if a threshold number of seconds have not passed since the particular task was created or since the particular task woke up after sleeping longer than a sleep threshold.

16. The non-transitory, tangible processor readable storage medium of claim 13, comprising:
  determining whether a ratio of a new workload to the total workload is greater than or equal to a threshold;
  setting the frequency of the processor to a frequency selected by a performance-biased load-to-frequency-function if the ratio is greater than or equal to the threshold; and
  setting the frequency of the processor to a frequency selected by a balanced load-to-frequency function if the ratio is less than or equal to the threshold.

17. The non-transitory, tangible processor readable storage medium of claim 13, wherein controlling the frequency of the processor includes:
  applying a group-specific-load-to-frequency-function to the load of each of the workload groups to obtain a plurality of group-specific-frequency-contribution-values;
  applying a weighting factor to each of the group-specific-frequency-contribution-values to obtain a plurality of weighted-group-specific-frequency-contribution values, wherein the weighting factor is between 0 and 1, inclusive;
  adding each of the weighted-group-specific-frequency-contribution values to obtain the frequency.

* * * * *